(12) United States Patent
Baumgartner et al.

(10) Patent No.: US 7,815,021 B2
(45) Date of Patent: Oct. 19, 2010

(54) SELF-ENERGIZING DISC BRAKE WITH AN ELECTROMECHANICAL ACTUATOR

(75) Inventors: Johann Baumgartner, Moosburg (DE); Robert Trimpe, Wessling (DE); Robert Gruber, Olching (DE); Steffen Geissler, Hallbergmoos (DE); Aleksandar Pericevic, Munich (DE); Matthias Seidenschwang, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/171,825

(22) Filed: Jul. 11, 2008

(65) Prior Publication Data
US 2009/0045018 A1 Feb. 19, 2009

Related U.S. Application Data

(63) Continuation of application No. PCT/EP2007/000160, filed on Jan. 10, 2007.

(30) Foreign Application Priority Data

Jan. 12, 2006 (DE) .................. 10 2006 001 550
Jun. 29, 2006 (DE) .................. 10 2006 029 942

(51) Int. Cl.
*F16D 55/08* (2006.01)
(52) U.S. Cl. .................. 188/72.9; 188/72.7
(58) Field of Classification Search ........... 188/72.9, 188/72.2, 72.7, 70 B, 71.8, 72.3–72.6, 72.8
See application file for complete search history.

(56) References Cited

U.S. PATENT DOCUMENTS

| 3,800,920 | A  | * | 4/1974  | Warwick ............... 188/106 F |
| 6,899,204 | B2 | * | 5/2005  | Baumgartner et al. ...... 188/72.9 |
| 6,986,411 | B2 | * | 1/2006  | Schautt et al. ............ 188/72.7 |
| 7,073,636 | B2 | * | 7/2006  | Baumann et al. .......... 188/72.2 |
| 2004/0262098 | A1 |  | 12/2004 | Baumann et al. |
| 2005/0067233 | A1 |  | 3/2005  | Nilsson et al. |
| 2005/0109566 | A1 |  | 5/2005  | Baumann et al. |

FOREIGN PATENT DOCUMENTS

| DE | 103 47 942 A1   | 5/2005 |
| DE | 10 2005 030 618 A1 | 4/2006 |
| EP | 0 894 685 B1    | 2/1999 |

OTHER PUBLICATIONS

Form PCT/IB/326 (one (1) page); Form PCT/IB/373 (one (1) page); Form PCT/IB/338 (one (1) page); and Form PCT/ISA/237 (nine (9) pages) for a total of (twelve (12) pages).
International Search Report dated Apr. 17, 2007 with an English translation (Six (6) page).

* cited by examiner

*Primary Examiner*—Melanie Torres Williams
(74) *Attorney, Agent, or Firm*—Crowell & Moring LLP

(57) ABSTRACT

A disc brake is provided having an electromechanical actuator, which is designed as an electric motor, for actuating a brake application device for applying the brake, which disc brake has a self-energizing device, characterized in that the electric motor acts directly or via a gearing on a rotary lever which acts on at least one brake piston which moves a brake pad parallel to the brake disc rotational axis, which brake pad is moveable both in the direction parallel to the brake disc rotational axis and also parallel to the brake disc friction face.

41 Claims, 2 Drawing Sheets

SELF-ENERGIZING DISC BRAKE WITH AN ELECTROMECHANICAL ACTUATOR

CROSS REFERENCE TO RELATED APPLICATIONS

This application is a continuation of PCT International Application No. PCT/EP2007/000160, filed Jan. 10, 2007, which claims priority under 35 U.S.C. §119 to German Patent Application No. 10 2006 001 550.9 filed Jan. 12, 2006 and German Patent Application No. 10 2006 029 942.6 filed Jan. 29, 2006, the entire disclosures of which are herein expressly incorporated by reference.

BACKGROUND AND SUMMARY OF THE INVENTION

The invention relates to a disc brake with an electromechanical actuator, which is designed as an electric motor, for actuating an application device for applying the brake, which application device has a self-energizing device.

Disc brakes of this type are known per se. It has not hitherto been possible for them to become established in practice since no structurally and economically convincing concepts have been proposed, only concept studies.

Suitable as a self-energizing device is for example a ramp or wedge surface, against which is supported the brake lining which is moved not only perpendicularly to the brake disc but rather also in the rotational direction or parallel to the brake disc.

The application device can for example comprise a planetary gear set which is driven by an electric motor as an actuator. During an operation of the service brake, the planetary gear set actuates an element (for example an eccentric shaft) which deflects the actuating force and which, by means of a pressure plate, moves the brake lining in the circumferential direction of the brake disc so as to utilize the self-energizing effect. During an operation of the parking brake, the planetary gear set drives two self-locking threaded spindles, which are arranged in parallel, by means of an external gearwheel. The threaded spindles convert the introduced rotational movement into a linear movement of the spindle nuts, and thereby press the brake lining against the brake disc.

The planetary gear set of the arrangement is subjected to very high torques during braking processes. As a result of this loading and the relatively small available installation space in the wheel brake, it is necessary to use a relatively high-grade planetary gear set or other gearwheel mechanism.

Against this background, it is the object of the invention to specify an alternative concept for realizing a self-energizing disc brake which can be realized in a cost-effective manner. Also desirable is good efficiency, since this directly influences the required drive power of the electric motor.

The invention creates a disc brake with an electromechanical actuator, which is designed as an electric motor, for actuating an application device for applying the brake, which application device has a self-energizing device, with the electric motor acting directly, or via a gearing, on a rotary lever which acts on at least one brake piston which moves a brake lining parallel to the brake disc rotational axis, which brake lining is movable both in the direction parallel to the brake disc rotational axis and also parallel to the brake disc friction surface.

This concept can be implemented in a cost-effective manner in particular without expensive, high-precision parts, and offers the possibility of realizing good efficiency.

The invention makes it possible to realize a particularly reliable and simple-design self-energizing disc brake with electromechanical actuation, in the realization of which it is advantageously also possible to utilize known components from the field of pneumatic disc brakes for utility vehicles, such as rotary levers and their bearing arrangements, with an application parallel to the brake disc rotational axis being utilized to apply the brake linings even though these must also perform a movement in the circumferential direction during the braking process.

One particular advantage of the application perpendicular to the brake disc is also to be considered that the controller of the brake need not identify the movement direction of the vehicle when the brake is applied.

The electric motor, in a compact design, preferably has a linear gearing which acts on the rotary lever. Said linear gearing can be designed as a recirculating ball drive.

In order to ensure the mobility of the brake lining parallel to the brake disc friction surface, it is expedient if a bearing is arranged between the brake lining and the brake piston, which bearing realizes or permits the movement of the brake lining perpendicular to the application movement of the rotary lever, that is to say parallel to the brake disc friction surface.

It is also expedient if the brake piston is arranged parallel to at least one or more energizing pistons which, with their one end, are supported directly or via a bearing on the brake caliper and, at their other end, have, at least as a self-energizing device, at least one ramp surface which is inclined with respect to the brake disc friction surface. Here, an arrangement of the brake piston between two of the energizing pistons is particularly space-saving.

The energizing pistons preferably have double-acting ramp surfaces such that said energizing pistons act as ramp surfaces for self-energizing during braking during forward and reverse travel.

Here, it is expedient to arrange rolling bodies between the energizing pistons and the brake lining. The ramps are preferably formed in the energizing pistons and a recess is correspondingly formed in the lining, which recess engages around the rolling bodies in a substantially form-fitting fashion in the manner of a spherical cap and into which recess is inserted a bearing such as a plain bearing, such that the rolling bodies can roll on the ramps. Also conceivable, but less preferable, are an inverse arrangement with the ramps in the lining carrier plate and with a virtually form-fitting, for example spherical-cap-like recess in the energizing pistons or in an additional pressure plate, or else an embodiment with ramps in both elements.

It is expedient to arrange rolling bodies between the ramp surfaces of the energizing pistons and the brake lining.

The electric motor is also preferably connected to a control device for controlling the braking process, in order to control the self-energizing action as a function of the parameters present during the braking process. Here, it is possible to incorporate sensors and/or mathematical methods into the control.

FIG. 1 shows an embodiment, explained in more detail further below, with a constant ramp angle α between the ramps and the brake disc friction surface. Constant ramp angles, in particular degressively running ramp angles, are possible.

In this way, a particularly simple structural design is obtained which is characterized by a robust design, good functional reliability and low production costs. Here, balls are cost-effective rolling bodies which are virtually self-aligning in the ramp surface. To increase the load capacity, the balls can also run in matched running grooves.

A variant with rollers as rolling bodies would, in contrast, have a particularly small amount of hysteresis (not illustrated here).

Also contemplated is a variant in which the ramp angle of the recesses in the circumferential direction about the longitudinal axis of the adjusting nuts or brake pistons is not constant but rather variable, such that a ramp angle α of different gradient is present depending on the rotational position of the nuts. For this purpose, ball running grooves with different gradient are arranged for the different rotational positions.

It is thereby possible for the application characteristic to be varied in a simple manner by virtue of the nuts being rotated, for example by means of a separate adjusting actuator, preferably of electromechanical design (for example a further, relatively small electric motor), which rotates the nuts for example by means of a drive output shaft with a gearwheel, by virtue of said adjusting actuator, with the drive output wheel, driving one of the nuts for example at an external toothing of its flange, and the other nut being co-driven by means of a belt drive which is wrapped around the two nuts.

In this way, it is also possible to increase the degree of self-energizing which can be obtained in the limit region of the friction value. The switching can however take place only in the released state since the nuts cannot rotate during the applications of the brake.

The ramps can also describe an arc, such that the lining follows the geometry of the brake ring, or the ring geometry of the brake disc, during its movement.

Other objects, advantages and novel features of the present invention will become apparent from the following detailed description of the invention when considered in conjunction with the accompanying drawings.

DETAILED DESCRIPTION OF THE DRAWINGS

Figure 1:
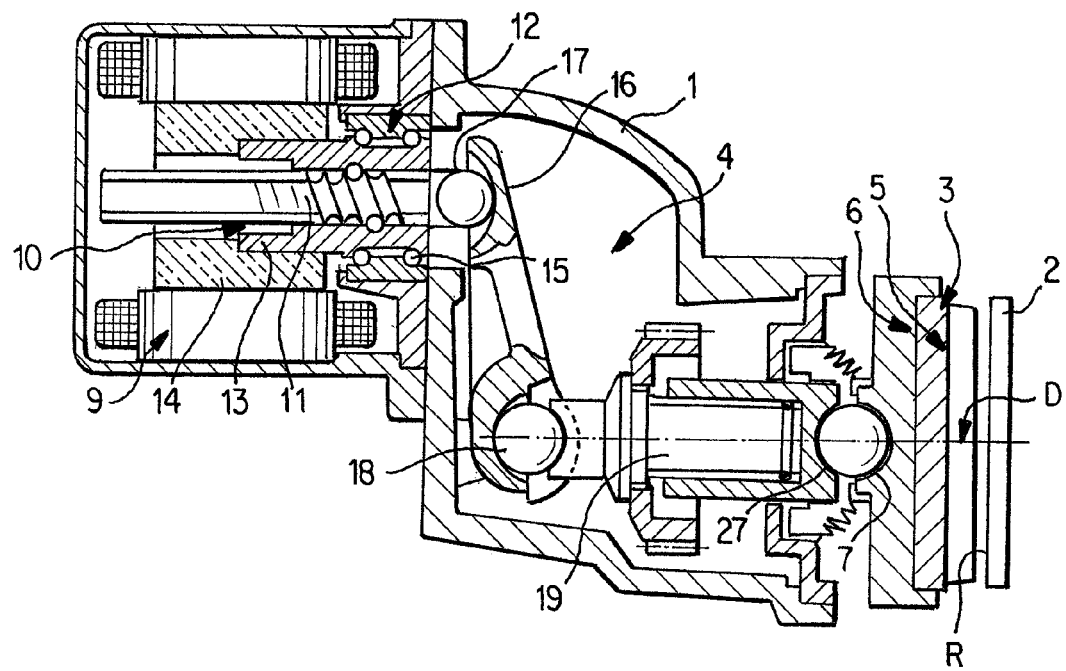
FIG. 1 shows a section through a diagrammatic sketch of a disc brake.

The brake as per FIG. 1 is based on a brake caliper 1 which encompasses a brake disc 2 in the upper peripheral region, with only the application-side region being illustrated here. The brake disc 2 can engage around in the upper peripheral region in a known way.

Figure 2:
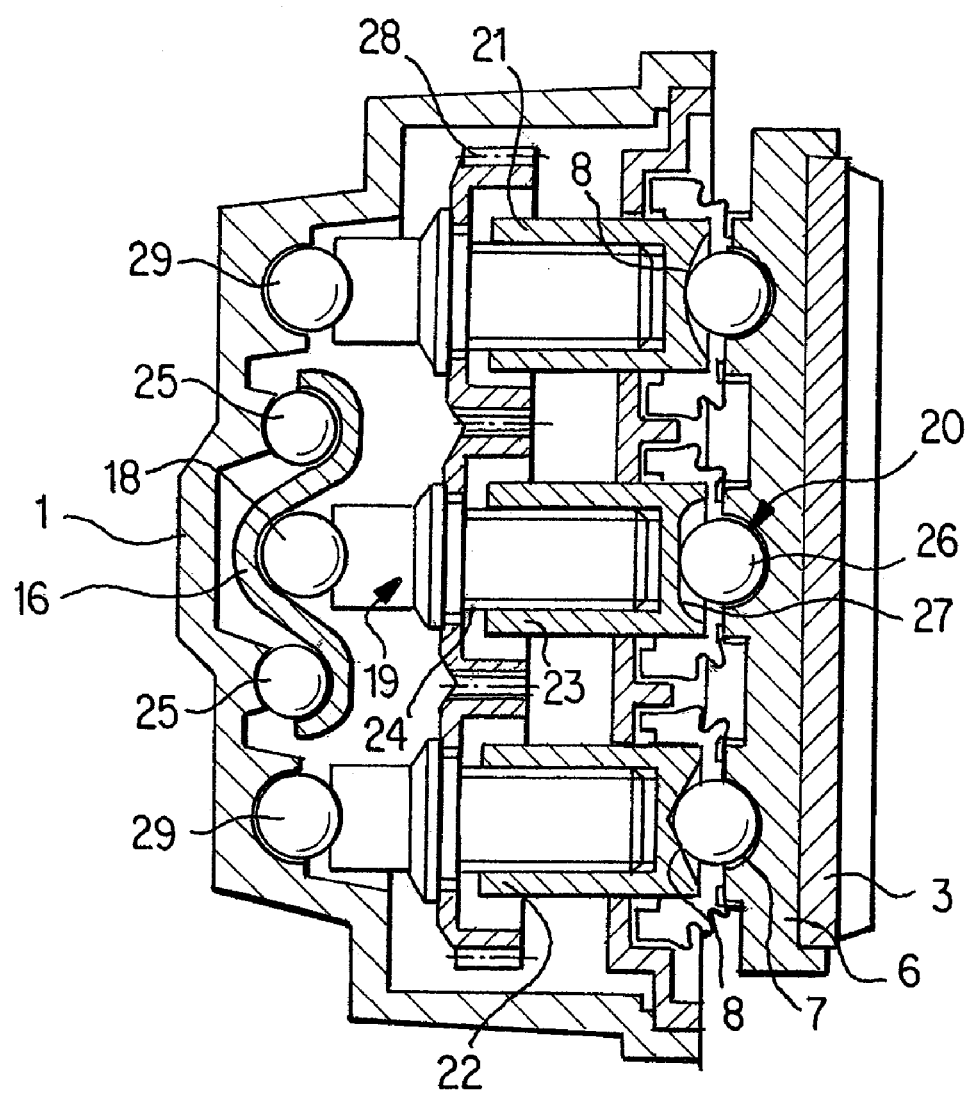
FIG. 2 shows a section, perpendicular to FIG. 1, through the disc brake from FIG. 1.

To apply the brake, a first application-side brake lining 3 is moved toward the brake disc parallel to the brake disc axis by means of an application device 4, which brake lining 3 is supported with its pressure plate 5, which is inserted into a further carrier plate 6, in the circumferential direction of the brake disc 2 via rolling bodies 7 against a wedge surface or ramp surface 8 (FIG. 2), which wedge surface or ramp surface 8 is aligned obliquely with respect to the brake disc friction surface such that said brake lining 3 is additionally moved in the direction of the brake disc 2 once the lining is pressed against the brake disc friction surface and is moved by the latter in the circumferential direction.

The contact against the further brake lining on the reaction side is realized for example by means of an axial mobility, which is realized at least in the outer circumferential region, of the brake disc 2, and/or by means of a movable arrangement of the brake caliper 1, for example on a brake carrier (not illustrated here), such that the brake according to the invention is equally suitable for sliding caliper, pivoting caliper and fixed caliper concepts (not illustrated here).

The application device 4 is assigned an electric motor 9, which is arranged within or preferably outside the brake caliper 1, as an actuator, which has a linear gearing 10 for converting its rotational movements into a linear movement of a pressure element 11. Said pressure element is in this case the spindle of a recirculating ball drive 12. Other concepts are conceivable. Advantageous is a linear or substantially linear drive output movement of the electric motor.

Here, the nut 13 of the recirculating ball spindle is fixedly connected to the rotor 14 of the electric motor and is mounted together with said rotor in a ball bearing arrangement 15.

The drive unit is directly flange-mounted, in a similar way to an actuating cylinder of a compressed-air-actuated disc brake, on the brake or on its brake caliper 1.

The spindle 11 acts, for example via a ball 17, on a first end of a rotary lever 16 which is mounted with its further end in the brake caliper 1 by way of a bearing arrangement 25.

The further end of the eccentrically mounted rotary lever or brake lever acts, for example via a ball 18 or a suitable projection, on an actuating piston 19 which, for the purpose of wear adjustment, is itself axially variable in length by virtue of being composed for example of a nut 23 and a spindle 24.

The actuating piston 19 transmits the movement of the rotary lever 16 into an application movement of the brake lining 3 parallel to the brake disc rotational axis.

Formed between the brake lining 3 and the rotary lever 16 is a rolling or plain bearing 20 which is composed here of a roller 26 which is movable in a recess 27 of the actuating piston and which is held in the carrier plate 6 in a plain bearing shell (not shown here). The bearing 20 is designed to permit movements of the brake lining or of the brake lining unit 3, 6 parallel to the brake disc friction surface R, that is to say substantially perpendicular to the brake disc rotational axis (which lies parallel to the line D).

The actuating piston 19 is arranged here centrally between two energizing pistons 21, 22 which, at their end facing toward the brake disc, have the double-acting wedge or ramp surfaces 8 for example as raceways for the rolling bodies 7, and which serve as ramp surfaces against which the brake lining 3 or the unit composed of the elements 3 and 4 is supported in the circumferential direction during braking during forward and reverse travel.

The energizing pistons 21, 22 are preferably likewise axially variable in length in order to compensate lining wear. Said energizing pistons 21, 22 can be rotatably mounted, with their ends facing away from the brake lining, in the brake caliper (bearing 29).

In the event of a brake actuation, the actuating piston 19 is moved by means of the electromagnetic drive and the rotary lever 16 in the direction of the brake disc 2 until the air play is overcome and the brake lining 3 is pressed against the rotating brake disc 2.

As a result of the friction generated between the brake disc 2 and the brake lining 3, the brake lining 3 is co-driven in the circumferential direction until the rolling bodies 7 run on the ramp surfaces 8 of the energizing pistons 21, 22 which are inclined with respect to the brake disc axis.

The energizing pistons 21, 22 are positioned parallel to the actuating piston 19 and additionally press the brake lining against the brake disc.

Here, the application system is designed such that only compressive forces can be transmitted. The restoring movement can take place, as in the case of compressed-air-actuated brakes, by means of restoring springs.

Also advantageous here, however, is a design as a tension/compression system (not illustrated here), that is to say a coupling of the elements of the application unit 4 in such a way that the brake lining 3 can be actively restored in order to fully release the brake or else in order to be able to intervene in the braking process at least for control purposes if the braking action becomes too intense.

As can be seen, the spindles 24 of the actuating piston and of the energizing pistons 19, 20, 21 engage into one another at an external toothing 28 in order to realize a synchronization of their rotational movements. In this way, a synchronization device is realized, by way of example, for the axial length variation of the pistons, which is advantageous for lining wear compensation.

A separate adjusting drive for the axial length variation of said pistons 19, 21, 22 can have a further motor which engages on the external toothing of one of the spindles (not illustrated here).

The proposed brake is of simple construction and is nevertheless compact and reliable. It also permits a relatively high degree of self-energizing, such that it requires only a relatively small drive.

The application unit or ramp can be designed, defined by an angle α, either as a compression ramp, tension ramp or tension-compression ramp. In the case in particular of a tension-compression ramp, a self-locking system is advantageously selected as a drive, that is to say a high force in the direction of the actuation which results from an unusually high/low friction value cannot lead to an uncontrollable movement of the ramp.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

| Table of Reference Symbols | |
|---|---|
| Extension | 1 |
| Brake disc | 2 |
| Brake pad | 3 |
| Brake Application device | 4 |
| Pressure plate | 5 |
| Carrier plate | 6 |
| Rolling bodies | 7 |
| Ramp surface | 8 |
| Electric motor | 9 |
| Linear gearing | 10 |
| Pressure element | 11 |
| Recirculating ball drive | 12 |
| Nut | 13 |
| Rotor | 14 |
| Ball bearing arrangement | 15 |
| Ball | 17 |
| Rotary lever | 16 |
| Ball | 18 |
| Actuating piston | 19 |
| Rolling bearing | 20 |
| Pressure pistons | 21, 22 |
| Nut | 23 |
| Spindle | 24 |
| Bearing arrangement | 25 |
| Roller | 26 |
| Recess | 27 |
| External toothing | 28 |
| Bearing | 29 |

What is claimed is:

1. A disc brake having an electromechanical actuator configured as an electric motor for actuating the brake, comprising:
    a brake application device having a self-energizing device which is self-energizing during use of the brake application device for service brake application, a rotary lever, at least one brake piston, and at least one energizing piston; wherein
    the electric motor acts directly, or via a gearing, on the rotary lever that acts on the at least one brake piston to move a brake pad parallel to a rotational axis of the brake disc;
    the brake pad is moveable both in a direction parallel to the rotational axis of the brake disc and in a direction parallel to a friction surface of the brake disc,
    the brake piston is arranged parallel to at least one or more energizing pistons which, with their one end, are supported directly or via a bearing on a caliper and, at their other end, have, at least as the self-energizing device, at least one ramp surface which is inclined with respect to the brake disk friction surface, and
    the brake piston is arranged between two of the energizing pistons.

2. The disc brake according to claim 1, wherein the electric motor drives a linear gearing, which linear gearing acts upon the rotary lever.

3. The disc brake according to claim 1, further comprising:
    a bearing arranged between the brake pad and the brake piston, said bearing permitting a movement of the brake pad perpendicular to an application movement of the rotary lever.

4. The disc brake according to claim 3, wherein the bearing is at least one of a plain and rolling bearing.

5. The disc brake according to claim 3, wherein the brake piston has an axially variable length.

6. The disc brake according to claim 1, wherein the brake piston is arranged parallel to at least one or more energizing pistons which, with their one end, are supported directly or via a bearing on a caliper and, at their other end, have, at least as the self-energizing device, at least one ramp surface which is inclined with respect to the brake disk friction surface.

7. The disc brake according to claim 6, wherein the brake piston is arranged between two of the energizing pistons.

8. The disk brake according to claim 7, wherein the energizing pistons have double-acting ramp surfaces such that said energizing pistons act as ramp surfaces for self-energizing during braking during forward and reverse travel.

9. The disk brake according to claim 8, wherein rolling bodies are arranged between the energizing pistons and the brake pad.

10. The disk brake according to claim 1, wherein the ramp angle of the recesses in the circumferential direction about the longitudinal axis of the adjusting nuts or brake pistons is not constant but rather variable, such that a ramp angle α of different gradient is present depending on the rotational position of the nuts.

11. The disc brake according to claim 9, wherein ball running grooves with different gradients are arranged in the energizing pistons for the different rotational positions.

12. The disc brake according to claim 2, wherein the linear gearing is designed as a recirculating ball drive.

13. The disc brake according to claim 12, wherein a drive nut of the recirculating ball drive is connected to a rotor of the electric motor.

14. The disc brake according to claim 1, wherein the energizing pistons are axially variable in length.

15. The disc brake according to claim 6, wherein the piston and the energizing pistons are composed, in each case, of a nut and a spindle, which spindle is screwed into said nut.

16. The disc brake according to claim 6, wherein the piston and the energizing pistons are coupled to one another via a synchronization device.

17. The disc brake according to claim 15, wherein a pressure element of the spindle acts on one end of the rotary lever which is mounted with its other end eccentrically in a caliper.

18. The disc brake according to claim 12, wherein the electric motor is arranged as a unit with the recirculating ball drive on the outer surface of the caliper, and extends through the latter with a drive output spindle as a pressure element.

19. The disc brake according to claim 1, wherein the brake application device is operatively configured such that only compressive forces are transmitted to the brake pad.

20. The disc brake according to claim 1, wherein the brake application device is operatively configured such that tensile and compressive forces are transmittable to the brake pad.

21. The disc brake according to claim 1, wherein the electric motor is connected to a control device for controlling the braking process.

22. The disc brake according to claim 8, wherein the ramp angle is not constant.

23. The disc brake according to claim 22, wherein the ramp angle runs depressively.

24. The disc brake according to claim 8, wherein the ramps describe two arcs, such that the brake pad follows a geometry of the brake disc during movement.

25. A disc brake having a brake actuator configured for actuating the brake, comprising:
a brake application device having a self-energizing device which is self-energizing during use of the brake application device for service brake application, a rotary lever, at least one brake piston, and at least one energizing piston;
wherein
the brake actuator acts directly, or via a gearing, on the rotary lever that acts on the at least one brake piston to move a brake pad parallel to a rotational axis of the brake disc; and
the brake pad is moveable both in a direction parallel to the rotational axis of the brake disc and in a direction parallel to a friction surface of the brake disc,
the brake piston is arranged parallel to at least one or more energizing pistons which, with their one end, are supported directly or via a bearing on a caliper and, at their other end, have, at least as the self-energizing device, at least one ramp surface which is inclined with respect to the brake disk friction surface, and
the brake piston is arranged between two of the energizing pistons.

26. The disc brake according to claim 25, further comprising:
a bearing arranged between the brake pad and the brake piston, said bearing permitting a movement of the brake pad perpendicular to an application movement of the rotary lever.

27. The disc brake according to claim 26, wherein the bearing is at least one of a plain and rolling bearing.

28. The disc brake according to claim 26, wherein the brake piston has an axially variable length.

29. The disk brake according to claim 25, wherein the energizing pistons have double-acting ramp surfaces such that said energizing pistons act as ramp surfaces for self-energizing during braking during forward and reverse travel.

30. The disk brake according to claim 29, wherein rolling bodies are arranged between the energizing pistons and the brake pad.

31. The disk brake according to claim 25, wherein the ramp angle of the recesses in the circumferential direction about the longitudinal axis of the adjusting nuts or brake pistons is variable, such that a ramp angle α of different gradient is present depending on the rotational position of the nuts.

32. The disc brake according to claim 30, wherein ball running grooves with different gradients are arranged in the energizing pistons for the different rotational positions.

33. The disc brake according to claim 25, wherein the energizing pistons are axially variable in length.

34. The disc brake according to claim 25, wherein the piston and the energizing pistons are composed, in each case, of a nut and a spindle, which spindle is screwed into said nut.

35. The disc brake according to claim 25, wherein the piston and the energizing pistons are coupled to one another via a synchronization device.

36. The disc brake according to claim 34, wherein a pressure element of the spindle acts on one end of the rotary lever which is mounted with its other end eccentrically in a caliper.

37. The disc brake according to claim 25, wherein the brake application device is operatively configured such that only compressive forces are transmitted to the brake pad.

38. The disc brake according to claim 25, wherein the brake application device is operatively configured such that tensile and compressive forces are transmittable to the brake pad.

39. The disc brake according to claim 29, wherein the ramp angle is not constant.

40. The disc brake according to claim 39, wherein the ramp angle runs degressively.

41. The disc brake according to claim 29, wherein the ramps describe two arcs, such that the brake pad follows a geometry of the brake disc during movement.

* * * * *